US012662110B2

(12) United States Patent
Mounzer et al.

(10) Patent No.: US 12,662,110 B2
(45) Date of Patent: Jun. 23, 2026

(54) METHOD FOR CONTROLLING A DECELERATION REQUEST IN A ONE-PEDAL-DRIVING MODE OF A VEHICLE, COMPUTER PROGRAM PRODUCT, DATA PROCESSING APPARATUS, AND VEHICLE

(71) Applicant: Volvo Car Corporation, Gothenburg (SE)

(72) Inventors: Raid Mounzer, Gothenburg (SE); Rudrendu Shekhar, Gothenburg (SE); Mikael Riikonen, Gothenburg (SE); Mattias Kroon, Gothenburg (SE); Fredrik Sjöblom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/675,568

(22) Filed: May 28, 2024

(65) Prior Publication Data

US 2024/0400037 A1      Dec. 5, 2024

(30) Foreign Application Priority Data

Jun. 1, 2023      (EP) ..................................... 23176682

(51) Int. Cl.
*B60W 30/02*          (2012.01)
*B60T 7/12*           (2006.01)
(Continued)

(52) U.S. Cl.
CPC ............... *B60W 30/02* (2013.01); *B60T 7/12* (2013.01); *B60T 8/1755* (2013.01); (Continued)

(58) Field of Classification Search
CPC ................. B60W 30/02; B60W 30/04; B60W 30/18109; B60W 2520/28; (Continued)

(56) References Cited

U.S. PATENT DOCUMENTS

| | | | |
|---|---|---|---|
| 9,889,853 B2 * | 2/2018 | Yamaoka | ................ B60L 15/20 |
| 11,584,225 B2 | 2/2023 | Velazquez Alcantar et al. | |

(Continued)

FOREIGN PATENT DOCUMENTS

| | | | | |
|---|---|---|---|---|
| CN | 103587516 A | * | 2/2014 | ............... B60T 7/22 |
| EP | 3 275 723 A1 | | 1/2018 | |

(Continued)

OTHER PUBLICATIONS

Extended European Search Report received for European Application Serial No. 23176682.5 dated Nov. 23, 2023, 7 pages.

(Continued)

*Primary Examiner* — Hai H Huynh
(74) *Attorney, Agent, or Firm* — Amin, Turocy & Watson, LLP

(57)          ABSTRACT

The disclosure relates to controlling a deceleration request in a one-pedal-driving mode of a vehicle. The deceleration request can comprise a deceleration level being a function of a position of a drive pedal of the vehicle. A corresponding method can comprise receiving, by a system comprising a processor, a vehicle stability information, the vehicle stability information being indicative for driving stability of the vehicle, comparing, by the system, the vehicle stability information to a vehicle stability information threshold, and triggering, by the system, a reduction of the deceleration level of the deceleration request if the vehicle stability information is determined to exceed the vehicle stability information threshold.

20 Claims, 1 Drawing Sheet

(51) Int. Cl.
　　*B60T 8/1755*　　　(2006.01)
　　*B60W 30/18*　　　(2012.01)

(52) U.S. Cl.
　　CPC .... *B60W 30/18109* (2013.01); *B60T 2270/60* (2013.01); *B60W 2520/28* (2013.01); *B60W 2540/10* (2013.01); *B60W 2540/12* (2013.01); *B60W 2540/18* (2013.01)

(58) Field of Classification Search
　　CPC ..... B60W 2520/105; B60W 2520/125; B60W 2520/14; B60W 2520/16; B60W 2520/18; B60W 2520/26; B60W 2540/10; B60W 2540/12; B60W 2540/18; B60W 50/12; B60W 2050/0029; B60W 2050/0031; B60W 2720/106; B60T 7/12; B60T 8/1755; B60T 2270/60; B60T 2270/604; B60L 15/20; B60L 2240/24
　　USPC .......................................................... 701/70
　　See application file for complete search history.

(56)　　　　　References Cited

U.S. PATENT DOCUMENTS

| | | |
|---|---|---|
| 2016/0236672 A1 | 8/2016 | Yanagida et al. |
| 2017/0259828 A1 | 9/2017 | Yamaoka et al. |
| 2021/0039624 A1 | 2/2021 | Umetsu et al. |
| 2022/0111844 A1 | 4/2022 | Kim et al. |
| 2022/0297691 A1 | 9/2022 | Knueven et al. |
| 2024/0246517 A1* | 7/2024 | Mounzer ................. B60T 8/175 |

FOREIGN PATENT DOCUMENTS

| | | |
|---|---|---|
| JP | 2010241245 A | 10/2010 |
| WO | 2020104085 A1 | 5/2020 |

OTHER PUBLICATIONS

Cuma, et al., "Design and implementation of algorithms for one pedal driving in electric buses," Engineering Science and Technology, an International Journal, 24 (Date of Publication: Jan. 15, 2021), pp. 138-144.

Shijil, et al., "Braking control strategies based on single-pedal regenerative braking and neural network for Electric Vehicles," Published in: 2021 IEEE International Power and Renewable Energy Conference (IPRECON) (Publication Date of Conference: Sep. 24-26, 2021), DOI: 10.1109/IPRECON52453.2021.9640722.

* cited by examiner

METHOD FOR CONTROLLING A DECELERATION REQUEST IN A ONE-PEDAL-DRIVING MODE OF A VEHICLE, COMPUTER PROGRAM PRODUCT, DATA PROCESSING APPARATUS, AND VEHICLE

CROSS REFERENCE TO RELATED APPLICATIONS

This application claims the benefit of and priority to pending EP patent application Ser. No. 23/176,682.5, filed Jun. 1, 2023, and entitled "METHOD FOR CONTROL-LING A DECELERATION REQUEST IN A ONE-PEDAL-DRIVING MODE OF A VEHICLE, COMPUTER PRO-GRAM PRODUCT, DATA PROCESSING APPARATUS, AND VEHICLE," the entirety of which is hereby incorporated by reference herein.

TECHNICAL FIELD

The present disclosure relates to vehicles and, more particularly, to controlling a deceleration request in a one-pedal-driving mode of a vehicle.

BACKGROUND

One-pedal-driving is a concept of speed control for a vehicle, wherein the vehicle can be actively accelerated and actively decelerated using one pedal of the vehicle only. A corresponding drive mode is called a one-pedal driving mode. Such a drive mode is especially used in electric vehicles such as battery electric vehicles, for example.

For one-pedal-driving, if the drive pedal or, in other terms, accelerator pedal is depressed, an acceleration request is generated for the associated vehicle, i.e., the vehicle is requested to accelerate. If the drive pedal is fully or partially released from a fully or partially depressed position, a deceleration request is generated for the associated vehicle, i.e., the vehicle is requested to decelerate. The same may happen if the use of a driver assistance system, e.g., an automatic cruise control, is cancelled.

In this context, both an acceleration level of the acceleration request and a deceleration level of the deceleration request usually are a function of a position of the drive pedal. This means that the vehicle is requested to strongly accelerate if the drive pedal is deeply depressed, wherein the vehicle is requested to slightly accelerate if the drive pedal is depressed just a little. Correspondingly, the vehicle is requested to strongly decelerate if the drive pedal is released fully or to a high extent, wherein the vehicle only is requested to decelerate a little, if the drive pedal is only released by a small amount.

SUMMARY

The present disclosure relates to a method for controlling a deceleration request in a one-pedal-driving mode of a vehicle as well as a thereto corresponding computer program product, data processing apparatus, and vehicle.

It is desired that a vehicle drives in a stable and predictable manner. This, of course, also applies in connection with a one-pedal-driving mode. In a situation in which the vehicle decelerates while a one-pedal-driving mode is used, stable, and predictable driving behavior needs to be ensured. To this end, for example, antilock braking systems or stability control systems may be used in connection with a one-pedal-driving mode.

The deceleration level set by the deceleration request as function of the position of the drive pedal may correspond to the levels most encountered in everyday driving, thus relieving the driver from switching back and forth between the drive pedal and the brake pedal when driving around the city, for example. These levels of deceleration may be chosen to be high enough to cover most common deceleration needs, but low enough not to cause any vehicle instability in most cases.

During most driving scenarios, the deceleration level requested by the one-pedal-driving is easily handleable without causing any vehicle instability. However, when the wheels are close to their available friction limits, e.g., when driving on streets with low friction or with high lateral acceleration it has been found by the inventors that the additional deceleration torque requested by one-pedal-driving may increase the longitudinal forces on the wheels thus reducing the wheels' ability to generate lateral forces. Depending on which wheels (front or rear) become saturated, the vehicle may experience a change in its handling characteristics and its response to driver's inputs and becomes either more understeered or more oversteered. Another problem is that the stability of the vehicle may differ significantly depending on whether one-pedal-driving is being used by the driver or not.

To counteract this, the driver of the vehicle must press the drive pedal to remove the additional deceleration request. However, it has been found by the inventors that it is not intuitive for the driver to press the drive pedal to reduce braking. Additionally, stepping on the drive pedal just enough to get out of the situation without overcompensating and losing a significant amount of the available deceleration based on the available friction is a very challenging task.

While activation of the antilock braking system or stability control system of the vehicle may optimally be able to prevent an accident, the driving discomfort involved with activation of such a system for the driver is significant.

It is an objective of the present disclosure to further improve driving stability, consistency and predictability of a driving behavior of a vehicle in the context of a one-pedal-driving mode.

The problem is at least partially solved or alleviated by the subject matter of the independent claims of the present disclosure, wherein further examples are incorporated in the dependent claims.

According to a first aspect, there is provided a method for controlling a deceleration request in a one-pedal-driving mode of a vehicle, the deceleration request comprising a deceleration level being a function of a position of a drive pedal of the vehicle, the method comprising:

receiving a vehicle stability information, the vehicle stability information being indicative for the driving stability of the vehicle, comparing the vehicle stability information to a vehicle stability information threshold, and triggering a reduction of the deceleration level of the deceleration request if the vehicle stability information exceeds the vehicle stability information threshold.

Accordingly, the method enables control of the deceleration level in a certain driving situation of the vehicle, where the position of the drive pedal is changed, e.g., the drive pedal is released to decelerate the vehicle. A vehicle stability threshold may be predetermined to set a sensitivity for when the control of the deceleration level by means of reduction of the deceleration level of the deceleration request associated with the change of position of the drive pedal shall be triggered. The triggered reduction of the deceleration level may consequently be applied by or to the vehicle.

The method accordingly provides for an effective means of how a driving situation as described above or similar situations may be countered by the vehicle without requiring the driver to perform challenging tasks as described above and even before the driver may take note of the situation. Further, with respect to driving situations as exemplary described above, the reduced deceleration level has the effect that longitudinal forces on the wheels reducing the wheels' ability to generate lateral forces are reduced or at least not increased, i.e., a longitudinal wheel slip is reduced or at least not increased. Consequently, the driving stability of the vehicle is enhanced.

Furthermore, due to the fact that a driver of a vehicle may usually not expect the wheels of the vehicle to get significant longitudinal slip, reducing the longitudinal wheel slip by reducing the deceleration level of the deceleration request increases the predictability of the driving behavior. Predictability of driving behavior enhances road safety since only then, a driver can react appropriately to a current or upcoming traffic situation.

Accordingly, the method disclosed herein can mitigate any negative effect caused by one-pedal-driving on vehicle stability and handling, either in the above driving situation described in detail, or other driving situations. Specifically, the control of the deceleration request provided by the method may maintain or bring back a safe driving stability of the vehicle. Further, a seamless driving experience with one-pedal-driving, as well as a more consistent vehicle behavior, may be provided by means of the method disclosed herein.

The method may be at least partly computer-implemented, and may be implemented in software or in hardware, or in software and hardware. Further, the method may be carried out by computer program instructions running on means, such as a data processing apparatus, for example, that provides data processing functions. The data processing apparatus may be a suitable computing means or included in such means, such as an electronic control module or controller, for example, which may also be a distributed computer system. The data processing apparatus or the computer, respectively, may comprise one or more of a processor, a memory, a data interface, and the like.

It is noted that the method according to the present disclosure is executed on a vehicle level. This means that the controlled deceleration request relates to a deceleration of the vehicle in its entirety. Consequently, other systems may be used in order to split the deceleration request on vehicle level into wheel-specific deceleration requests. A wheel-specific deceleration request is to be understood as a deceleration request for a single wheel of the vehicle. The wheel specific deceleration request may relate to a reference deceleration torque. Moreover, the fact that the present method is executed on a vehicle level does not exclude other vehicle dynamics systems from being used. Examples of vehicle dynamics systems include brake antilock systems, traction control systems, and driving stability control systems.

It is further noted that the method of the present disclosure relates to controlling a deceleration request, i.e., a desired deceleration. It is noted that an actual deceleration of a vehicle for which the method is performed, may differ from the request.

In an example, the deceleration level of the deceleration request comprises a deceleration level which has been most common for past driving cycles. This means that the standard deceleration level is determined based on a driving history. Setting the standard deceleration level to the most common deceleration level has the advantage that the necessity to use a brake pedal may be reduced. The standard deceleration level is, thus, high enough to cover most driving situations and low enough not to cause instability of the vehicle in usual driving situations. This deceleration level may be reduced when performing the method of the present disclosure. This may be necessary if driving with high lateral acceleration.

In an example, triggering a reduction of the deceleration level of the deceleration request comprises triggering a reduction by a reduction increment. This has the advantage that after the reduction by a reduction increment, the driving situation can be re-evaluated. This means that updated vehicle stability information can be collected and assessed. In doing so, an over-compensation of reduced vehicle stability may be avoided or at least reduced to a minimum. The reduction increment may be predefined, e.g., having a fixed or several fixed values. For example, the reduction increment may be predefined based on the vehicle stability information, specifically a level of stability included in or associated with the vehicle stability information.

In an example, the vehicle stability information may be based on at least one determined vehicle motion and/or at least one determined driving intention. The at least one vehicle motion and/or the at least one driving intention may be determined by the method by receiving corresponding vehicle motion and/or driving intention information. The received vehicle motion and/or driving intention information may comprise signals or values, e.g., based on sensor readings or measurements at the vehicle, for example. The vehicle stability information may comprise one or more values representing the vehicle stability based on the vehicle motion(s) and/or the driving intention(s). Accordingly, the vehicle stability information may be a quantitative information indicative for the driving stability of the vehicle. This facilitates its comparison to the vehicle stability information threshold.

The vehicle stability information threshold may comprise one or more threshold values for one or more values representing the vehicle stability based on the vehicle motion(s) and/or the driving intention(s). In particular, each value based on the vehicle motion(s) and/or the driving intention(s) may have a separate threshold value in the vehicle stability information threshold, for example. Alternatively, a common threshold value for the vehicle stability information threshold may be used and compared to a single value of the vehicle stability information, for example.

Combining both, the vehicle motion(s) and driving intention(s), to determine the vehicle stability information increases the accuracy with which a vehicle stability may be estimated based on the vehicle stability information. In particular, the method may include calculating one or more values of the vehicle stability information based on the at least one determined vehicle motion and/or the at least one determined driving intention, which may be represented by one or more sensor readings and/or measurements at the vehicle, for example.

In an example, the at least one determined vehicle motion may be based at least on one sensor or sensor input. In an example, the at least one determined vehicle motion may at least be based on at least one wheel speed sensor and/or an inertia measurement unit of the vehicle. The wheel speed sensors and inertia measurement unit are understood as exemplary sensors for determining the vehicle motion. In particular, the determined vehicle motion may be determined based on all wheel speed sensors of a vehicle. The inertia measurement unit may comprise an accelerometer and/or a gyroscope, for example. The accelerometer may be configured to measure an acceleration of the vehicle at least in the vehicle lateral direction. The gyroscope may be configured to measure at least a yaw rate of the vehicle. The at least one determined vehicle motion may be based on one or both of the accelerometer and the gyroscope.

In an example, the at least one determined vehicle motion may at least be based on a vehicle stability model. The vehicle stability model may be a computing and/or virtual model of the vehicle stability. Specifically, the vehicle stability model may be configured for calculating the vehicle stability based on different driving situations, specifically indicated by different driving parameters, e.g., speed, acceleration, yaw rate, etc. Accordingly, the vehicle stability model may be used in the method to provide, in particular compute, the vehicle stability information.

In an example, the at least one determined driving intention may be based on at least one driver input sensor of the vehicle. A driver input sensor as mentioned herein may be understood as an input sensor accessible to the driver to control operation of the vehicle.

In an example, the at least one driver input sensor may be at least one of a steering angle sensor, a brake pedal sensor, or a drive pedal sensor of the vehicle. In particular, multiple or all of the aforementioned driver input sensors may be used to increase the accuracy of the vehicle stability information.

In an example, the at least one determined driving intention may be based on a driver model. The driver model may be a computing and/or virtual model of a set of driving operations of a driver. Specifically, the driver model may be able to calculate the vehicle stability based on different driving situations, specifically indicated by different driving operations. Accordingly, the driver model may be used in the method to provide, in particular compute, the vehicle stability information.

In an example, the method is executed periodically and/or according to a predefined schedule. This has the effect that the performance of the method can be regularly adapted to a driving situation changing over time. In more detail, the magnitude of the reduction of the deceleration level may be adapted to a changing driving situation. This also includes that the execution of the method may be abandoned if it is not needed any more.

In an example, the deceleration level of the deceleration request may be increased if the vehicle stability information does not exceed the vehicle stability threshold anymore. Specifically, through periodically and/or according to the predefined schedule executing the method, it may be recognized when the threshold is not exceeded anymore, meaning that sufficient driving stability of the vehicle is determined. In this case, increasing the deceleration level, in particular back to its normal level, which may be defined by the driving history as explained above, increases the driving safety, recuperation and comfort for the driver given that the reduced deceleration level is not required anymore.

In an example, the deceleration request comprises or relates to a regenerative deceleration and/or a deceleration through service brakes of the vehicle. The service brakes may be friction brakes, for example. Thus, the deceleration request may request an electric machine to operate as a generator and thereby decelerate the vehicle. Alternatively, or additionally, the deceleration request may request a friction brake to be activated in order to decelerate the vehicle.

In an example, the method further comprises:
receiving a brake pedal operation information, and
eliminating the reduction of the deceleration level of the deceleration request.

In other words, the deceleration level of the deceleration request is put back to its unreduced state if the brake pedal is depressed by a driver. The brake pedal operation information may be based on the brake pedal sensor, specifically a sensor reading thereof. Thus, operating the brake pedal overrules the reduction of the deceleration level. In this context, the reduction of the deceleration level may be eliminated in one step or in several steps, i.e., gradually. Since in a situation in which a driver operates the brake pedal, the driver intends to request a deceleration of the vehicle being higher than the current deceleration level or which is usually provided by releasing the drive pedal, eliminating the reduction of the deceleration level in such a case improves the predictability of the vehicle behavior.

In an example, eliminating the reduction of the deceleration level of the deceleration request comprises ramping out the reduction of the deceleration level. This means that the deceleration level is continually increased up to its original level over a time span, which may be predefined. The increase may also be performed in several steps. In other words, the method does not react abruptly. Thus, the driving behavior of the vehicle is predictable for a driver at all times.

According to a second aspect, there is provided a computer program comprising instructions which, when the computer program is executed by a computer, cause the computer to carry out the method of the present disclosure. Using such a computer program increases the driving stability and the predictability of the driving behavior of a vehicle.

The computer program product may be a computer program as such or a product containing the computer program, such as a computer-readable storage medium. Accordingly, such product may comprise instructions which, when executed by a computer, cause the computer to carry out the method of the present disclosure.

According to a third aspect, there is provided a data processing apparatus comprising means for carrying out the method of the present disclosure. As has already been explained in connection with the method according to the present disclosure, using such a data processing apparatus increases the driving stability and the predictability of the driving behavior of a vehicle.

The data processing apparatus may be configured as a controller for controlling a deceleration request in a one-pedal-driving mode of the vehicle, the deceleration request relating to a deceleration level being a function of a position of a drive pedal of the vehicle, the controller being configured to carry out the method of the present disclosure.

According to a fourth aspect, there is provided a vehicle comprising the data processing apparatus of this disclosure. Using such a vehicle increases the driving stability and the predictability of the driving behavior of the vehicle.

It should be noted that the above examples may be combined with each other irrespective of the aspect involved.

BRIEF DESCRIPTION OF THE DRAWINGS

These and other aspects of the present disclosure will become apparent from and elucidated with reference to the examples described hereinafter.

Examples of the disclosure will be described in the following with reference to the following drawings.

DETAILED DESCRIPTION

The Figures are merely schematic representations and serve only to illustrate examples of the disclosure. Identical or equivalent elements are in principle provided with the same reference signs.

Figure 1:
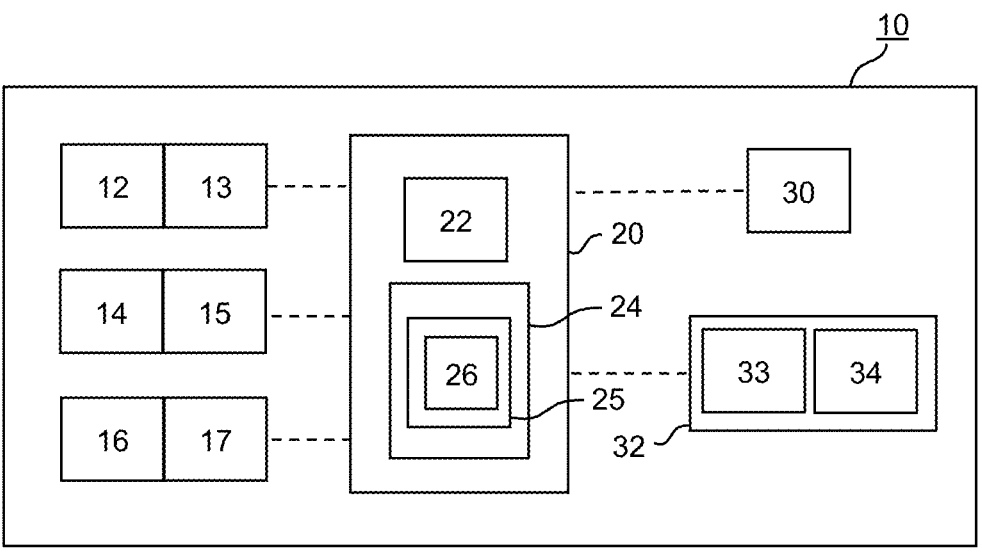
FIG. 1 shows a vehicle according to the present disclosure having a data processing apparatus according to the present disclosure, a computer-readable storage medium according to the present disclosure, and a computer program according to the present disclosure, wherein a method for controlling a deceleration request in a one-pedal-driving mode can be executed in connection with the vehicle.

FIG. 1 schematically shows a vehicle 10. In the present example, the vehicle 10 is a battery electric vehicle.

The vehicle 10 comprises a drive pedal 12 and a brake pedal 14. In this context, the vehicle 10 is configured to be used in a one-pedal-driving mode. This means that the vehicle 10 may be actively decelerated simply by fully or partially releasing the drive pedal 12 from a fully or partially depressed position.

The vehicle 10 also comprises a data processing apparatus in the form of a controller 20 being configured to control a driving operation of the vehicle 10, specifically the one-pedal-driving of the vehicle 10. This means that the controller 20 is able to control a deceleration, specifically a regenerative deceleration and/or a deceleration through friction brakes (not shown) of the vehicle 10. For the regenerative deceleration, the controller 20 may control a deceleration of each or some of the wheels (not shown) of the vehicle 10 using an electric traction machine (not shown) of the vehicle 10 operating in a generator mode. For the deceleration through friction brakes, the controller 20 may control a deceleration of each or multiple of the wheels of the vehicle 10 using the friction brakes.

The controller 20 may be communicatively connected to the drive pedal 12 and to the brake pedal 14. Specifically, the controller 20 may be communicatively connected to a drive pedal sensor 13 and a brake pedal sensor 15 of the pedals 12, 14. Further, the vehicle 10 may comprise a steering device 16, such as a steering wheel, which may comprise a steering angle sensor 17 and which may also be connected to the controller 20.

The controller 20 in this example comprises a data processing unit 22 and a data storage unit 24. The data storage unit 24 comprises a computer-readable storage medium 25. On the computer-readable storage medium 25, there is provided a computer program 26. The computer program 26 and, thus, also the computer-readable storage medium 25 comprise instructions which, when the computer program 26 is executed by the data processing unit 22, cause the data processing unit 22 to carry out a method for controlling a deceleration request in a one-pedal-driving mode of the vehicle 10.

Consequently, the data processing unit 22 and the data storage unit 24 may also be called means for carrying out the method for controlling a deceleration request in a one-pedal-driving mode.

Figure 2:
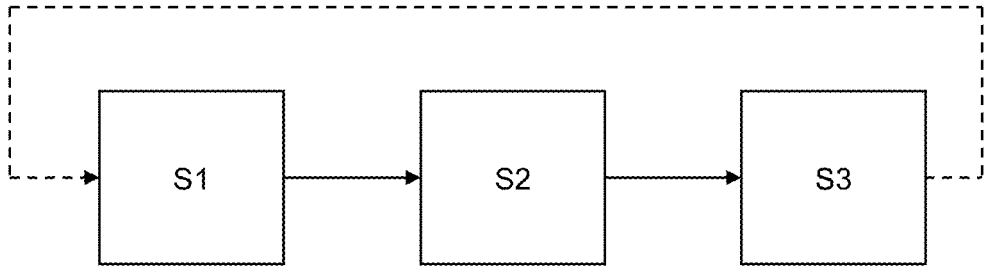
FIG. 2 illustrates steps of the method for controlling a deceleration request in a one-pedal-driving mode.

In the following, the method for controlling a deceleration request in a one-pedal-driving mode of the vehicle 10 will be explained in more detail in connection with FIG. 2.

The method is executed in a situation in which the vehicle 10 is in a one-pedal-driving mode. In this mode, the vehicle 10 may be actively decelerated either by operating its electric traction machine as a generator or by using its friction brake system. In the present example this is the case, if the drive pedal 12 is fully or partially released from a fully or partially depressed position.

In other words, a deceleration request defining a deceleration level, i.e., a desired deceleration, is generated by the controller 20, if the drive pedal 12 is fully or partially released from a fully or partially depressed position.

The deceleration level of the deceleration request is a function of a position of the drive pedal 12. This means that a higher deceleration level is requested in a case in which the drive pedal 12 is released to a large extent or is fully released. If the drive pedal 12 is just released a bit, a comparatively small deceleration level is requested.

For the performance of the method for controlling a deceleration request in a one-pedal-driving mode, it is assumed that the drive pedal 12 is released by a certain extent, e.g., from a depression of 50% of the pedal way to a depression of 20% of the pedal way.

In a first step S1 of the method, a vehicle stability information, the vehicle stability information being indicative for the driving stability of the vehicle 10, is received at the controller 20, specifically its data processing unit 22. This vehicle stability information may be calculated by the controller 20 or any other controller or computing unit in the vehicle, for example.

The vehicle stability information may be based on at least one determined vehicle motion, at least one determined driving intention, a vehicle stability model and/or a driver model. The at least one determined vehicle motion may be based on at least one wheel speed sensor 30 and/or an inertia measurement unit 32, which may comprise an accelerometer 33 and/or a gyroscope 34, of the vehicle 10. The at least one determined driving intention of the driver may be based on at least one driver input sensor of the vehicle 10, which may be any one or multiple of the aforementioned drive pedal sensor 13, brake pedal sensor 15 and steering angle sensor 17. The vehicle stability model and/or the driver model may be stored on the computer-readable storage medium 25, together with the computer program 26 or independent therefrom, for example. The vehicle stability information defines the vehicle stability of the vehicle 10, in particular in a quantitative and/or numerical way, in a given driving situation.

In a second step S2, the vehicle stability information is compared to a predefined vehicle stability information threshold. The vehicle stability information threshold may be predefined and/or stored on the computer-readable storage medium 25. For performing the comparison, the controller 20 or any other controller or computing unit of the vehicle 10 may be used.

Subsequently, in a third step S3, a reduction of the deceleration level of the deceleration request is triggered under the condition that the vehicle stability information exceeds the vehicle stability information threshold.

In the present example, the triggered reduction of the deceleration level comprises or relates a reduction increment. This means that the deceleration level is decreased or reduced by the reduction increment. Moreover, the method is performed periodically. This means that the method is triggered in accordance with a regular time schedule.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 vehicle
12 drive pedal
13 drive pedal sensor
14 brake pedal
15 brake pedal sensor
16 steering device
17 steering angle sensor
20 data processing apparatus, controller
22 data processing unit
24 data storage unit
25 computer-readable storage medium
26 computer program
30 wheel speed sensor
32 inertia measurement unit
33 accelerometer
34 gyroscope
S1 first step
S2 second step
S3 third step

What is claimed is:

1. A method for controlling a deceleration request in a one-pedal-driving mode of a vehicle, the deceleration request comprising a deceleration level being a function of a position of a drive pedal of the vehicle, the method comprising:

determining, by a system comprising a processor, using a driver model and based on at least one driver input sensor, a driving intention of a driver of the vehicle;

determining, by the system, based on the driving intention and at least one determined vehicle motion of the vehicle, a vehicle stability information, the vehicle stability information being indicative for driving stability of the vehicle;

comparing, by the system, the vehicle stability information to a vehicle stability information threshold; and in response to determining that the vehicle stability information exceeds the vehicle stability information threshold, triggering, by the system, a reduction of the deceleration level of the deceleration request, wherein an amount of the reduction is based on the vehicle stability information.

2. The method of claim 1, wherein the driver model comprises a virtual model of a set of driving operations of the driver.

3. The method of claim 2, wherein the virtual model models the set of driving operations of the driver under different driving situations.

4. The method of claim 1, wherein the at least one determined vehicle motion is based on at least one of a wheel speed sensor or an inertia measurement unit of the vehicle.

5. The method of claim 1, wherein the at least one determined vehicle motion is based on a vehicle stability model.

6. The method of claim 5, wherein the vehicle stability model comprises a virtual model of vehicle stability of the vehicle determined driving intention.

7. The method of claim 6, wherein the virtual model models the vehicle stability under different driving situations.

8. The method of claim 7, wherein the at least one driver input sensor comprises at least one of a steering angle sensor, a brake pedal sensor, or a drive pedal sensor of the vehicle.

9. The method of claim 1, wherein the method is executed periodically or according to a schedule.

10. The method of claim 9, further comprising:

increasing, by the system, the deceleration level of the deceleration request if the vehicle stability information is determined no longer to exceed the vehicle stability information threshold.

11. The method of claim 1, wherein the deceleration request comprises a regenerative deceleration or a deceleration through service brakes of the vehicle.

12. The method of claim 1, further comprising:

receiving, by the system, a brake pedal operation information; and eliminating, by the system, the reduction of the deceleration level of the deceleration request.

13. A vehicle, comprising:

at least one processor; and at least one memory that stores executable instructions that, when executed by the at least one processor, facilitate performance of operations, comprising:

determining using a driver model and based on at least one driver input sensor, a driving intention of a driver of the vehicle;

determining, based on the driving intention and at least one determined vehicle motion of the vehicle, a vehicle stability information, the vehicle stability information being indicative for driving stability of the vehicle;

comparing the vehicle stability information to a vehicle stability information threshold; and in response to determining that the vehicle stability information exceeds the vehicle stability information threshold, triggering a reduction of a deceleration level of a deceleration request, wherein an amount of the reduction is based on the vehicle stability information.

14. The vehicle of claim 13, wherein the driver model comprises a virtual model of a set of driving operations of the driver.

15. The vehicle of claim 13, wherein the at least one determined vehicle motion is based on at least one of a wheel speed sensor or an inertia measurement unit of the vehicle.

16. The vehicle of claim 13, wherein the at least one determined vehicle motion is based on a vehicle stability model.

17. A non-transitory machine-readable medium, comprising executable instructions that, when executed by a processor, facilitate performance of operations, comprising:

determining using a driver model and based on at least one driver input sensor, a driving intention of a driver of the vehicle;

determining, based on the driving intention and at least one determined vehicle motion of the vehicle, a vehicle stability information, the vehicle stability information being indicative for a driving stability of a vehicle;

comparing the vehicle stability information to a vehicle stability information threshold; and in response to determining that the vehicle stability information exceeds the vehicle stability information threshold, triggering a reduction of a deceleration level of a deceleration request, wherein an amount of the reduction is based on the vehicle stability information.

18. The non-transitory machine-readable medium of claim 17, wherein the driver model comprises a virtual model of a set of driving operations of the driver.

19. The non-transitory machine-readable medium of claim 18, wherein the virtual model models the set of driving operations of the driver under different driving situations.

20. The non-transitory machine-readable medium of claim 17, wherein the at least one driver input sensor comprises at least one of a steering angle sensor, a brake pedal sensor, or a drive pedal sensor of the vehicle.

* * * * *